March 19, 1957     H. MACALUSO     2,785,785
ROLLER CONVEYOR APPARATUS
Filed May 5, 1955
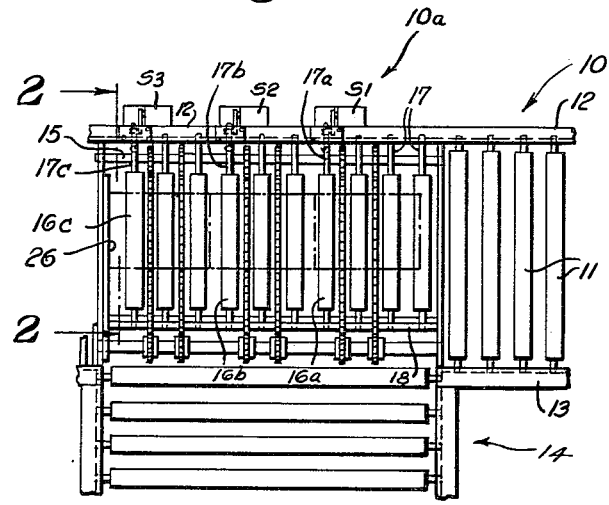
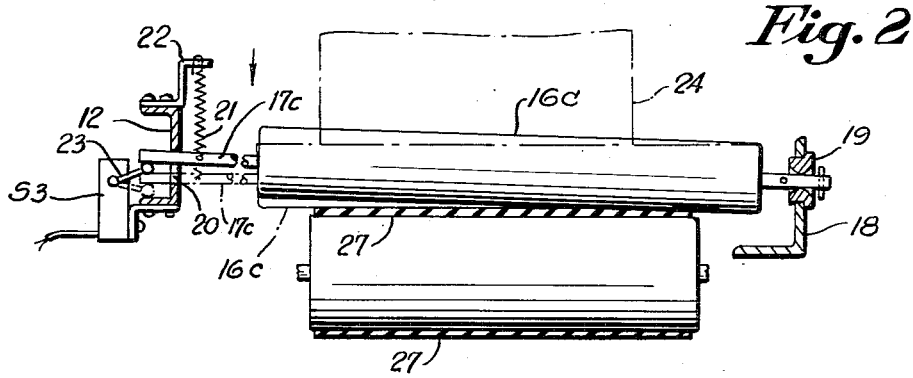
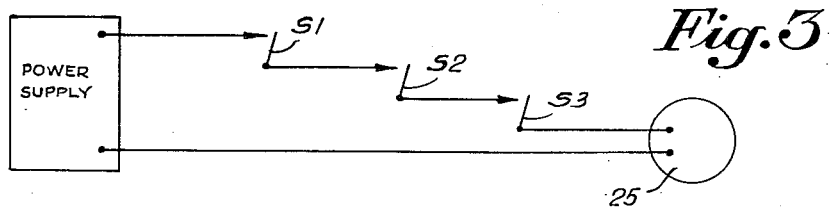

United States Patent Office 2,785,785
Patented Mar. 19, 1957

2,785,785
ROLLER CONVEYOR APPARATUS

Henry Macaluso, Clifton, N. J., assignor to P. Ballantine & Sons, Newark, N. J., a corporation of New Jersey Application May 5, 1955, Serial No. 506,123

2 Claims. (Cl. 198—21)

The present invention relates to conveyor apparatus for handling materials and more particularly to such apparatus in which the arrival of the materials being handled at fixed locations initiates a predetermined sequence of operations.

Conventional conveyor apparatus comprises a plurality of rollers supported in parallel side by side relation. Packaged materials, for example, may travel over and along the rollers with the rollers driven by suitable drive mechanism where necessary. The close spacing of the rollers of such conveyors has made the provision of necessary control members along the course of the conveyor extremely difficult. This has been so especially when it was desired to provide several control or actuating mechanisms adjacent one location along a conveyor course.

It is, therefore, an object of this invention to provide an improved control mechanism along the course of a conveyor which is especially well suited for actuation by an object, such as a package, as it travels along the conveyor.

Another object is to provide such a control mechanism, which requires a minimum of parts and which requires little or no additional space than normally required for the conveyor itself.

In accordance with the present invention certain ones of the conveyor rollers are mounted so that when engaged by an object travelling along the conveyor, the roller is displaced and thereby serves to actuate a switch or other suitable mechanism. In a preferred embodiment, a roller is mounted for rotation about a shaft which is biased upwardly by a spring. The roller projects a small distance above the adjacent rollers and when engaged by an object such as may travel along the conveyor path, the roller and shaft are depressed. The small downward motion of the roller and shaft is sufficient to actuate an adjacent switch.

Other objects and advantages of this invention will be apparent from the following detailed description thereof and the accompanying drawings in which Figure 1 is a plan view of a conveyor system broken away for convenience and embodying the present invention;

Figure 2 is a sectional view through the line 2—2 of Figure 1 and on an enlarged scale; and Figure 3 is a schematic diagram illustrating a mode of operation of the present invention.

Referring now to the drawings, conveyor 10 may comprise a plurality of rollers 11 mounted for rotation between side members 12, 13. Section 10a of conveyor 10 may form part of a loading bay and may be adapted to deliver packages to loading table 14. To this end, delivery means 15 are provided which when actuated deliver packages from section 10a to loading table 14. Rollers 11 are suitably driven as by belts so that packages placed upon conveyor 10 are delivered to section 10a thereof.

Delivery means 15 while only partially indicated in Figure 1, are set forth in detail in the copending application of E. A. Wahl and R. J. Winters filed December 9, 1953, Serial No. 397,855, now Patent No. 2,716,497, and assigned to the assignee of the present application. For the purpose of fully understanding the present invention it is believed sufficient to note here that normally delivery means 15 are removed from the path of packages along conveyor section 10a and only when actuated do delivery means 15 engage the packages and propel them onto loading table 14.

Conveyor section 10a comprises conventional rollers 16 mounted for rotation about shafts 17 supported between side member 12 and member 18. As shown most clearly in Figure 2, roller 16c is rotatably mounted on shaft 17c. Shaft 17c is connected to side member 18 by means of a crowned bearing 19 which permits shaft 17c to rock vertically to a limited extent. Adjacent its opposite end, shaft 17c extends through a vertically extending, elongated slot 20 formed in side member 12 and is biased upwardly by spring 21 connected to side member 12 by means of bracket 22. Switch S–3 is also supported on side member 12 and is positioned with its arm 23 extending below and in engagement with shaft 17c. As indicated in broken lines in Figure 2, roller 16c is depressed when engaged by an article such as the package indicated at 24, extending spring 21 and rotating arm 23 downward to actuate switch S–3. In the present instance switch S–3 is normally open and arm 23 is biased counterclockwise (as viewed in Figure 2) by a spring (not shown) which is weak compared to spring 21.

As shown in Figure 1, rollers 16a and 16b are identical in every respect with roller 16c and are biased upwardly in the same manner as was described in connection with roller 16c. Switches S–1 and S–2 are mounted on side member 12 as was described in connection with switch S–3 and are each actuated by downward movement of shafts 17a and 17c respectively. Shafts 17a and b corresponds to shaft 17c, both being mounted and biased upwardly as described and shown in connection with shaft 17c.

The number of rollers which are mounted for actuation as they are engaged by a package and the interval therebetween will of course be determined in each instance by the requirements of the installation. In the present instance three rollers 16a–c are provided since it is desired to deliver two or three packages to table 14 depending upon their orientation. The width of the packages may be assumed to be such that three must be in position on section 10a in order to depress all three rollers 16a–c when the packages are oriented with their length parallel to rollers 16. When turned 90°, two packages suffice to engage the three rollers.

As shown in the schematic diagram of Figure 3 switches S–1, 2, and 3 may be connected in series with each other and with a motor 25 provided for driving delivery means 15. As packages 24 pass along conveyor sections 10a they engage and readily depress the raised rollers 16a, b, and c. Starting with section 10a of the conveyor empty of packages, the first package to reach conveyor section 10a will successively engage and pass over rollers 16a, b, and c. Assuming packages 24 to be oriented with their lengths parallel to rollers 16 the first package will clear roller 16a before engaging roller 16b and similarly it will clear roller 16b before engaging roller 16c. Consequently when the first package reaches stop bar 26, roller 16c will remain depressed by the weight of the package holding switch S–3 closed while rollers 16a and 16b will be in their raised positions and switches S–1 and 2 will be open. Similarly the second package to enter conveyor section 10a will pass over roller 16a and when it comes to rest against the first package it will hold roller 16b down to close switch S–2. As shown in Figure 3 as soon as the third package engages roller 16a to depress the same and close switch S–1, the circuit to motor 25 will be completed. It will of course be obvious that a suitable delay may be provided as for example by use of properly selected circuit components to delay completion of the circuit to motor 25 until the third package has closed on the second package.

In the event the packages are oriented with their lengths extending transversely with respect to rollers 16 the operation will be the same as described except that one package will engage and depress rollers 16b and c and the circuit will be completed when the second package is positioned to hold roller 16a down.

Closing of the circuit to motor 25 results in actuation of delivery means 15 to propel the packages in position on conveyor section 10a onto loading table 14. As soon as all of the packages have cleared conveyor section 10a rollers 16a, b, and c are each free to rise under the influence of their springs 21 and they are then ready to receive the next group of packages.

It is to be noted that rollers 16a, b, and c each projects a relatively small distance above the adjacent rollers 16. Also the weight of each of the packages or objects being handled is relatively large as compared to the force exerted by the shaft biasing springs 21. Consequently, the packages readily depress raised rollers 16a, b, or c. This is facilitated by the fact that at one end, that is the end thereof adjacent to side member 18, rollers 16a, b, and c project a relatively small distance above the adjacent rollers. Passage of the objects or packages over the raised rollers may be further facilitated by rotating rollers 16a, b, and c through a suitable drive means. Where, as in the present instance rollers 16 are driven by a flexible belt 27 (Figure 2) the relatively small angle through which rollers 16a, b, and c are displaced by springs 21 leaves a substantial portion of these rollers in engagement with the drive belt.

The present invention is especially well suited for use in conjunction with the type of apparatus shown in Figure 1 since drive means 15 has portions thereof which extend in the space between adjacent rollers 16 and leaves little or no space for the mounting of additional control means between the rollers. However, it will be apparent that the provision of upwardly displaced and biased rollers in accordance with the present invention will be useful in other types of installations where it is desired that the apparatus respond to the arrival of an object at a particular location along a conveyor.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a roller conveyor apparatus for handling objects having delivery means adapted for displacing objects from the conveyor upon arrival thereof at a predetermined location along the conveyor, a pair of spaced support members, a plurality of fixed rollers and at least one displaceable roller extending between said support members, means rotatably connecting said fixed rollers to said support members with the fixed rollers forming a horizontal path along which objects may travel, one of said support members having an elongated vertically extending slot formed therein, a shaft having one end portion thereof extending in said slot and displaceable toward and away from said path, means rockably connecting the other end portion of said shaft to the other support member, said displaceable roller being rotatably mounted on said shaft, resilient means urging said one end portion of said shaft toward said path with the roller mounted thereon projecting into said path and extending in a plane inclined to that of the adjacent fixed rollers, said resilient means being such that said shaft is displaced away from said path when the roller carried thereby is engaged by an object travelling along said path, and electric circuit means including a switch mounted adjacent to and actuated by displacement of said shaft and motor means for actuating said delivery means and responsive to said switch and actuated thereby upon displacement of said shaft by an object travelling said path engaging said displaceable roller.

2. In a conveyor apparatus for handling objects having delivery means adapted for displacing objects from the conveyor upon arrival of a predetermined number thereof at a predetermined location along the conveyor, a pair of spaced support members, a plurality of fixed rollers and a plurality of displaceable rollers extending in predetermined sequence between said support members, means rotatably connecting said fixed rollers to said support members with the fixed rollers forming a horizontal path along which objects may travel, a plurality of shafts one for each of said displaceable rollers and rotatably supporting the same, one of said support members having a plurality of elongated vertically extending slots formed therein one for each of said shafts, each of said shafts having one end portion thereof extending in one of said elongated slots and displaceable toward and away from said path, means rockably connecting the other end portion of each of said shafts to the other support member and including a plurality of crowned bearings one engaging each of said shafts, said displaceable rollers each projecting into said path along a plane inclined to that of said fixed rollers when the shaft carrying the same is displaced toward said path, resilient means urging each of said one end portion of said shafts toward said path with the resilient means such that each of said shafts is displaced away from said path to retract the roller mounted thereon when the latter is engaged by an object travelling said path, said displaceable rollers being disposed at said location along said conveyor and being mutually spaced so that all of said displaceable rollers are in their displaced positions simultaneously only upon the arrival of said predetermined number of objects at said location, and electric circuit means including a plurality of switches in series relation one mounted adjacent to and actuated by displacement each of said shafts and motor means for actuating said delivery means and responsive to actuation of all said switches.

References Cited in the file of this patent

UNITED STATES PATENTS

| | | |
|---|---|---|
| 500,127 | Hawkins et al. | June 27, 1893 |
| 2,180,127 | Solomon | Nov. 14, 1939 |
| 2,618,370 | Orwin | Nov. 18, 1952 |
| 2,705,570 | Maissian | Apr. 5, 1955 |